US012762601B2

(12) United States Patent
Park

(10) Patent No.: US 12,762,601 B2
(45) Date of Patent: Oct. 13, 2026

(54) VEHICLE MANAGEMENT SYSTEM FOR SMART BASE PARKING LOT, CONTROL SERVER THEREOF, AND VEHICLE MANAGEMENT METHOD THEREOF

(71) Applicants: HYUNDAI MOTOR COMPANY, Seoul (KR); Kia Corporation, Seoul (KR)

(72) Inventor: Se Min Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/758,316

(22) Filed: Jun. 28, 2024

(65) Prior Publication Data

US 2025/0225563 A1 Jul. 10, 2025

(30) Foreign Application Priority Data

Jan. 4, 2024 (KR) ........................ 10-2024-0001719

(51) Int. Cl.

*G06Q 30/0601* (2023.01)
*B60S 5/00* (2006.01)
*B60W 30/06* (2006.01)

(52) U.S. Cl.

CPC ......... *G06Q 30/0631* (2013.01); *B60W 30/06* (2013.01); *B60S 5/00* (2013.01); *B60W 2556/45* (2020.02)

(58) Field of Classification Search

CPC .... G06Q 30/0631; G06Q 10/20; G06Q 50/40; G06Q 50/10; B60W 30/06;

(Continued)

(56) References Cited

U.S. PATENT DOCUMENTS 10,845,807 B2 * 11/2020 Mukaiyama ....... B62D 15/0285
2019/0385265 A1 * 12/2019 Liu ....................... H04W 4/029

(Continued)

FOREIGN PATENT DOCUMENTS

AU 2013222225 B2 * 1/2016 ......... G06Q 30/0641

OTHER PUBLICATIONS

"5 Things to Know Before Taking Your Car Through an Automatic Car Wash" by Benjamin Hunting, Oct. 30, 2023. https://www.capitalone.com/cars/learn/finding-the-right-car/5-things-to-know-before-taking-your-car-through-an-automatic-car-wash/2731 (Year: 2023).*

(Continued)

*Primary Examiner* — Kito R Robinson
*Assistant Examiner* — Tanya C Sienko
(74) *Attorney, Agent, or Firm* — Fish & Richardson P.C.

(57) ABSTRACT

A vehicle management system for a smart base parking lot includes a vehicle that performs autonomous driving and remote communication, service point servers that manage pieces of operating information of service points located within a predetermined certain distance from smart base parking lots, and a control server that interworks with the service point servers to recommend vehicle management services available at service points corresponding to a destination provided from the vehicle during a parking time, when the destination is the smart base parking lot, and controls autonomous driving of the vehicle depending on the selected vehicle management service.

20 Claims, 5 Drawing Sheets

(58) Field of Classification Search
CPC ...... B60W 2556/45; B60S 5/00; G05D 1/228; G05D 1/247; H04W 4/02; H04W 4/38; H04W 4/40
See application file for complete search history.

(56) References Cited

U.S. PATENT DOCUMENTS

| | | | | |
|---|---|---|---|---|
| 2020/0042000 | A1* | 2/2020 | Jung | G05D 1/0061 |
| 2020/0401159 | A1* | 12/2020 | Asai | G01C 21/34 |
| 2020/0406866 | A1* | 12/2020 | Asai | G06V 10/764 |
| 2022/0207495 | A1* | 6/2022 | Derouen | G06Q 10/02 |
| 2022/0318767 | A1* | 10/2022 | Derouen | B60W 50/0205 |
| 2023/0311691 | A1* | 10/2023 | Cho | G06Q 50/40<br>701/24 |
| 2023/0406144 | A1* | 12/2023 | Dow | B60L 53/14 |
| 2024/0013164 | A1* | 1/2024 | Derouen | G07C 5/006 |
| 2025/0095488 | A1* | 3/2025 | Sun | G08G 1/096725 |

OTHER PUBLICATIONS

"Priority-based vehicle-to-grid Scheduling for minimization of power grid load variance" M. Hashim et al., Journal of Energy Storage 39 (2021) 102607 (Year: 2021).*

"The scheduling methods with different demand priorities for shared autonomous vehicle system in hybrid demands mode considering dynamic travel time" H. Cui et al., Physica A: 632 (2023) 129325 (Year: 2023).*

* cited by examiner

VEHICLE MANAGEMENT SYSTEM FOR SMART BASE PARKING LOT, CONTROL SERVER THEREOF, AND VEHICLE MANAGEMENT METHOD THEREOF

CROSS-REFERENCE TO RELATED APPLICATION

This application claims the benefit of priority to Korean Patent Application No. 10-2024-0001719, filed in the Korean Intellectual Property Office on Jan. 4, 2024, the entire contents of which are incorporated herein by reference.

TECHNICAL FIELD

The present disclosure relates to a vehicle management system for a smart base parking lot, a control server thereof, and a vehicle management method thereof, and more particularly, relates to a vehicle management system for a smart base parking lot to support a customer to receive various vehicle management services during a parking time using an autonomous driving technology and a method thereof.

BACKGROUND

A connected autonomous vehicle can operate without direct driver intervention while also offering diverse services through a connection between the vehicle system and a wireless network. Consequently, numerous companies have ventured into the connected car and autonomous vehicle sectors, placing significant emphasis on research and development.

SUMMARY

The present disclosure is directed to a vehicle management system for allowing a customer to receive services necessary for vehicle management during a parking time without putting separate effort or time using a connected autonomous vehicle.

According to an aspect of the present disclosure, a vehicle management system for a smart base parking lot can include a vehicle configured to perform autonomous driving and remote communication, one or more service point servers configured to manage operating information of one or more service points located within a predetermined certain distance from one or more smart base parking lots, and a control server configured to, based on a destination provided from the vehicle being the smart base parking lot, communicate with the one or more service point servers to recommend one or more vehicle management services available at one or more service points during a parking time corresponding to the destination, and control autonomous driving of the vehicle based on the one or more vehicle management services.

According to another aspect of the present disclosure, a control server of a vehicle management system can include a database storing pieces of information about smart base parking lots and information for each service point about service points corresponding to the smart base parking lots, a scheduler that generates a service combination of vehicle management services based on a destination and vehicle state information provided from a vehicle, service operation information about available service points corresponding to the destination, and the information for each service point about the available service points, the information being stored in the database, if receiving a scheduling command, and a controller that determines whether the destination is the smart base parking lot, requests and receives the service operation information from the available service points, when the destination is the smart base parking lot, and transmits the scheduling command to the scheduler.

According to another aspect of the present disclosure, a vehicle management method for a smart base parking lot can include determining whether a destination is a smart base parking lot, when receiving the destination from a vehicle, requesting and receiving service operation information from available service points corresponding to the destination, when the destination is the smart base parking lot, and generating a service combination of vehicle management services based on the destination and vehicle state information provided from the vehicle, the service operation information, and information for each service point about the available service points, the information being stored in a database.

DETAILED DESCRIPTION

Figure 1:
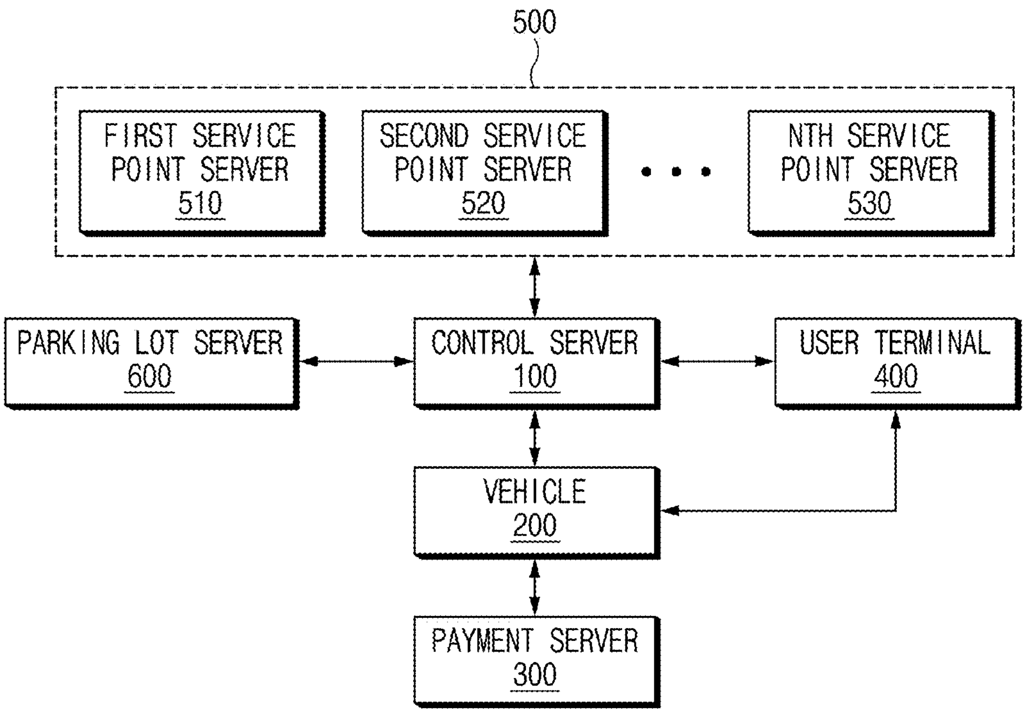
FIG. 1 is a block diagram illustrating an example of a vehicle management system for a smart base parking lot.

FIG. 1 is a block diagram illustrating a configuration of the entire system for describing a vehicle management system for a smart base parking lot.

Referring to FIG. 1, the vehicle management system for the smart base parking lot can include a control server 100, a vehicle 200, a payment server 300, a user terminal 400, and service point servers 500 (510 to 530), and a parking lot server 600.

The control server 100 may receive state information of the vehicle 200 from the vehicle 200. Herein, the state information of the vehicle 200 may include vehicle appearance information, sensor information, car washing information, an amount of charge, or the like.

The control server 100 may receive information about a destination input through audio, video, navigation, telematics (AVNT) of the vehicle 200 by a user from the vehicle 200.

The control server 100 may store available service point information for each smart base parking lot in a database.

If the destination input through the AVNT of the vehicle 200 by the user is a smart base parking lot, the control server 100 may query for a service available to the user and an available time for each service and may provide the user with the queried service and time through the AVNT of the vehicle 200.

The control server 100 may combine the services available to the user based on a priority algorithm, such that it takes a minimum time, and may recommend the combined service to the user through the AVNT of the vehicle 200.

Herein, the priority algorithm may determine priorities based on service point operation information, a service point location, vehicle state information, destination information, or available service point information for each base parking lot.

If the vehicle 200 arrives at a destination (e.g., a smart base parking lot) after the user selects a desired service, the control server 100 may move the vehicle 200 to vehicle management service points which provide the service selected by the user, such that the user is able to receive the service.

The control server 100 may interwork with the vehicle 200, the service point server 500, and the parking lot server 600 to determine a location of the vehicle 200 and a service progress situation.

The vehicle 200 may include a connected car or an autonomous vehicle. For example, the vehicle 200 may perform in-vehicle networking (IVN), vehicle-to-vehicle (V2V) communication, vehicle-to-infrastructure (V2I) communication, vehicle-to-nomadic devices (V2N) communication, vehicle-to-grid (V2G) communication to facilitate a network connection between system components.

Furthermore, the vehicle 200 may perform autonomous driving and parking based on a sensor, such as a camera, radio detection and ranging (RADAR), or light detection and ranging (LiDAR), and artificial intelligence (e.g., machine learning, deep learning, a convolution neural network, a deep neural network, or the like).

The vehicle 200 may receive a destination from the user through the AVNT. When the destination is received, the vehicle 200 may provide the control server 100 with destination information.

The vehicle 200 may check a vehicle state by means of sensors and may generate vehicle state information. Herein, the vehicle state information may include car washing information, sensor information, vehicle appearance information, or an amount of charge.

When providing the destination information entered by the user to the control server 100, the vehicle 200 may provide vehicle state information together.

If receiving location information of a service point and a movement command signal from the control server 100, the vehicle 200 may perform autonomous driving to move to the service point depending on the received location information of the service point and the received movement command signal. If receiving location information of a first service point and a movement command signal to the first service point from the control server 100, the vehicle 200 may perform autonomous driving to move to a place in which the first service point is located.

If receiving a command to return to the parking lot from the control server 100 after the vehicle management service is completed, the vehicle 200 may return to the smart base parking lot.

If receiving an exit signal after returning to the smart base parking lot, the vehicle 200 may perform autonomous driving to move to a predetermined pickup place.

If the vehicle 200 is about to arrive at a parking lot while receiving a parking lot movement command signal and moving to the parking lot, the vehicle 200 may receive a parking available location signal from the control server 100 and may autonomously park in a corresponding location (or a parking spot).

The payment server 300 may interwork with the vehicle 200. When the user selects the vehicle management service displayed on the AVNT in the vehicle 200 and pushes a payment button, the payment server 300 may automatically pay for a vehicle management service usage fee.

The payment server 300 may interwork with an in-car payment function to automatically pay for the vehicle management service usage fee.

The user terminal 400 may receive a notification that the vehicle management service is completed and the parking is completed and information about benefits enjoyed by a customer while the customer uses the vehicle management service and may display the notification and the information on its display.

The user terminal 400 may include a smartphone, a personal computer (PC), a laptop, an electronic pad, or the like.

When receiving an exit instruction from the user, the user terminal 400 may transmit an exit signal to the vehicle 200.

The service point servers 510 to 530 may manage operating information, such as schedules and business hours of corresponding service points, and may transmit operating information of the service point to the control server 100. Herein, the service point may refer to a service point which is located in a smart base parking lot or is located near the smart base parking lot (e.g., within 500 m from the smart base parking lot).

If the destination entered by the user is a smart base parking lot, the service point servers 510 to 530 may be servers of service points corresponding to the destination. For example, the service point servers 510 to 530 may be servers of service points near the smart base parking lot (e.g., within 500 m from the smart base parking lot).

The parking lot server 600 may manage parking lot operation information, such as the number of parking spaces available in a smart base parking lot or a parking available location, and may transmit parking lot information to the control server 100.

Figure 2:
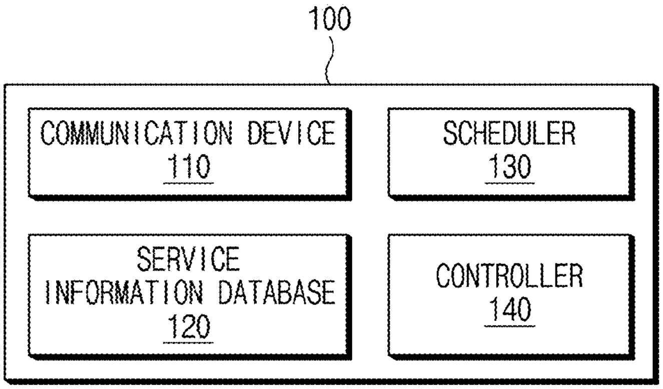
FIG. 2 is a block diagram illustrating an example of a control server.

FIG. 2 is a block diagram illustrating in detail a configuration of a control server 100.

Referring to FIG. 2, the control server 100 may include a communication device 110, a service information database 120, a scheduler 130, and a controller 140.

The communication device 110 may communicate with a vehicle 200, a user terminal 400, service point servers 510 to 530, and a parking lot server 600. For example, the communication device 110 may communicate with the vehicle 200, the user terminal 400, the service point servers 510 to 530, and the parking lot server 600 in a communication scheme such as 4th generation (4G) or 5th generation (5G).

The service information database 120 may store information for each service point and parking lot information respectively provided from the service point server 500 and the parking lot server 600. Herein, the information for each service point may include a service type, a service fee, a time taken to use a service, a service point location, or the like. The parking lot information may include the number of parking spaces available, a parking lot location, a parking fee, or the like.

The service information database 120 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The scheduler 130 may check an available time for each service based on destination information and vehicle state information provided from a vehicle 200 and location information and service operation information of a service point corresponding to a corresponding destination, which are stored in the service information database 120, may generate service combinations in which it takes a minimum time among available services, and may calculate a time and cost required when using the service.

The scheduler 130 may first generate a service combination of service points in a smart base parking lot or service points adjacent to the smart base parking lot (e.g., at which the distance from the smart base parking lot is within 500 m). For example, the scheduler 130 may generate a vehicle management service combination based on vehicle management services, such as charging, light maintenance, and car washing, and a previously programmed priority algorithm.

Herein, the priority algorithm may generate a service combination based on state information and destination information of the vehicle 200, which are provided from the vehicle 200, and information for each service point, which is stored in the service information database 120.

The scheduler 130 may set a priority for each service based on the priority algorithm, thus generating a service combination. For example, the scheduler 130 may set priorities in an order of charging, light maintenance, and car washing to generate a priority service combination. Furthermore, the scheduler 130 may adjust priorities of services based on the priority for each service and vehicle state information to generate a new service combination. Herein, the vehicle state information may include car washing information, sensor information, vehicle appearance information, an amount of charge, or the like.

The scheduler 130 may identify a vehicle management service preferred for each user using accumulated vehicle management service selection information of each user and may adjust a priority for each service based on the vehicle management service preferred by the user to generate a service combination.

The controller 140 may control the communication device 110, the service information database 120, the scheduler 130, and the vehicle 200 such that the vehicle 200 performs autonomous driving to move to a place in which each service point for providing the service selected by the user is located and such that service progress is performed when the vehicle 200 arrives at the service point.

The controller 140 may determine whether the destination entered by the user is a smart base parking lot based on the destination information and the vehicle state information received from the vehicle 200.

The controller 140 may determine whether the destination entered by the user is a smart base parking lot and may request service operation information from the service point servers 500 corresponding to the destination, if determining that the destination is the smart base parking lot.

The controller 140 may search the service information database 120 for a service point in the smart base parking lot or service points adjacent to the destination (e.g., 500 m from the destination) and may request service operation information from the servers 500 of the found service points.

The controller 140 may transmit the service combination generated by the scheduler 130 as s service recommendation information to the vehicle 200.

If receiving user selection information from the vehicle 200, the controller 140 may transmit a command to move to a service point to the vehicle 200. Herein, the user selection information may include a list and combination of vehicle management services which provide the vehicle management service selected by the user.

The controller 140 may provide the vehicle 200 with location information about the service point to move together with the command to move to the service point. For example, the controller 140 may transmit a command to move to a corresponding light maintenance service point together with location information of a service point which provides a light maintenance service to the vehicle 200. Furthermore, the controller 140 may transmit a command to move to a corresponding car washing service point together with location information of a service point which provides a car washing service to the vehicle 200.

Whenever each service is completed, the controller 140 may transmit the fact that each service is completed to the user terminal 400, thus notifying the user of a service progress situation.

If receiving a service completion notification from the vehicle 200, the controller 140 may transmit a command to return to a smart base parking lot to the vehicle 200.

If receiving a request for information about a parking spot from the vehicle 200, the controller 140 may communicate with a server 600 of the smart base parking lot and may check an available parking spot, thus providing the vehicle 200 with corresponding information.

Figure 3:
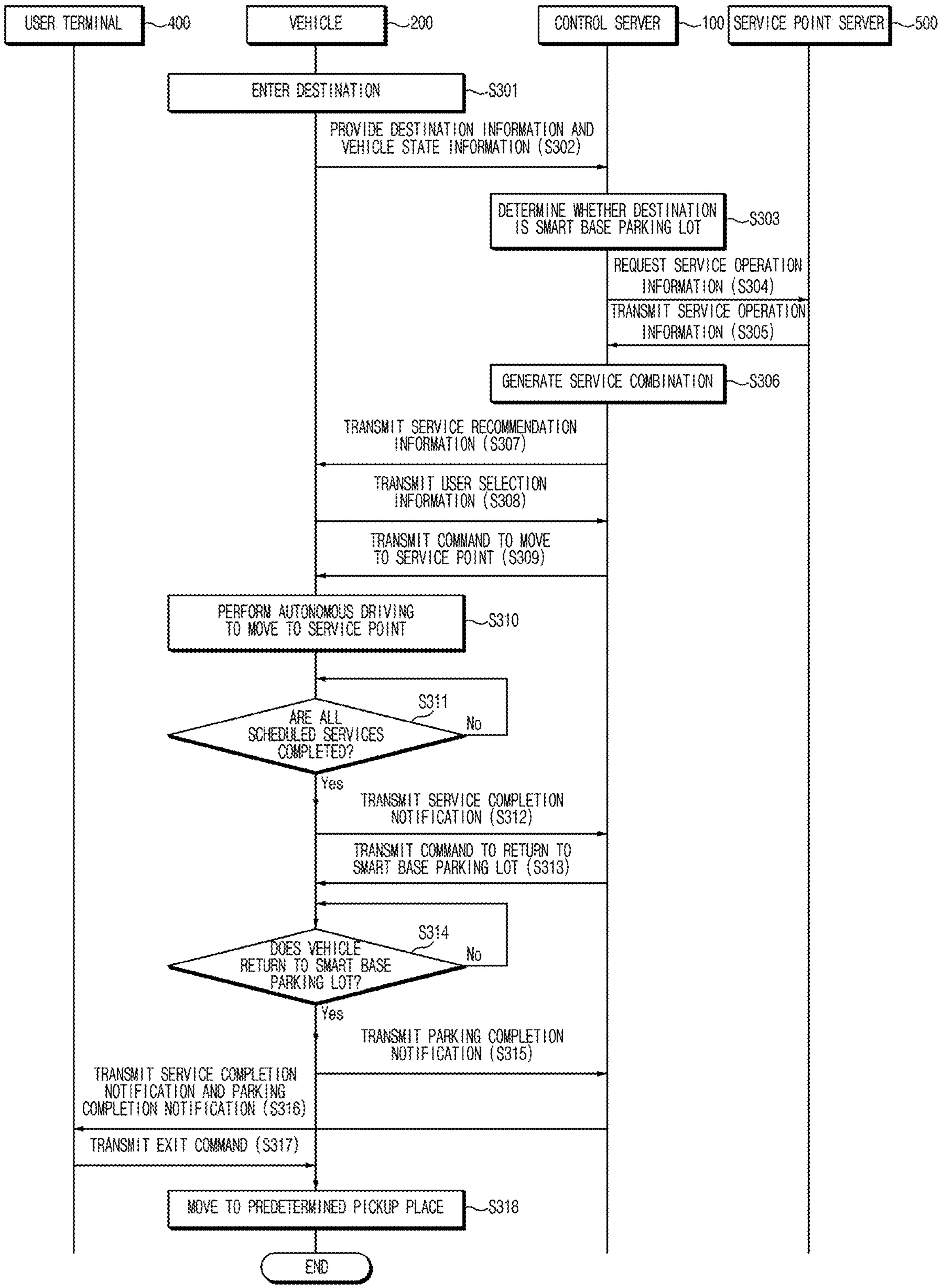
FIG. 3 is a signal sequence diagram for describing an example of a vehicle management method for a smart base parking lot.

FIG. 3 is a signal sequence diagram for describing a vehicle management method for a smart base parking lot.

Referring to FIG. 3, in S301, a vehicle 200 can receive a destination. For example, a user may enter a destination in a vehicle 200.

In S301, the destination may be entered through audio, video, navigation, telematics (AVNT) provided in the vehicle 200.

If the destination is received from the user, in S302, the vehicle 200 can provide a scheduler 130 of a control server 100 with destination information and vehicle state information. The vehicle state information in S302 can include at least one of car washing information, sensor information, vehicle appearance information, or an amount of charge.

If the destination information and the vehicle state information is received from the vehicle 200, in S303, a controller 140 of the control server 100 can determine whether the destination is a smart base parking lot.

Based on a determination that the destination is the smart base parking lot, in S304, the controller 140 can request service operation information from service point servers 500 corresponding to the destination. For example, the controller 140 of the control server 100 can search a service information database 120 of the control server 100 for service points located within 500 m from the destination and can request service operation information from servers 500 of the found service points.

If a request for the service operation information is received from the controller 140 of the control server 100, in S305, the service point servers 500 can transmit the service operation information regarding the service point to the controller 140 of the control server 100.

If the service operation information is received from the service point servers 500, the controller 140 of the control server 100 can transmit a scheduling command to the scheduler 130 of the control server 100.

If the scheduling command is received from the controller 140, in S306, the scheduler 130 of the control server 100 can perform a priority algorithm based on the vehicle state information and the destination information, available service point location information for each smart base parking lot, which is previously stored in the service information database 120 of the control server 100, and the service operation information provided from the service point servers 500, to thereby generate a service combination.

For example, in S306, the scheduler 130 of the control server 100 can check an available time for each service using the service operation information, can generate a service combination in which it takes a minimum time among available service combinations for each time zone, and can calculate cost required when using a corresponding service.

In S307, the controller 140 of the control server 100 can transmit the service combination generated in S306 as service recommendation information to the vehicle 200.

If the service recommendation information is received from the control server 100, the vehicle 200 can notify the user of the recommended service information through a user terminal's screen.

If a service selection is received from the user, in S308, the vehicle 200 can generate user selection information and can transmit the user selection information to the control server 100. The user may use a service depending on the service recommendation information provided in S308 from the control server 100 or may directly select a desired service to use the service.

If the user selection information is received from the vehicle 200, in S309, the controller 140 of the control server 100 can transmit a command to move to a service point to the vehicle 200.

The controller 140 can provide location information about the service point to move together with the command to move to the service point.

If the command to move to the service point is received from the control server 100, in S310, the vehicle 200 can perform autonomous driving to move to the service point based on the received location information and the received command. For example, if the user selects to receive charging, light maintenance, and car washing services in an order of charging, light maintenance, and car washing, the controller 140 can transmit a command to move to a corresponding charging service point together with location information of the service point which first provides the charging service to the vehicle 200. If the vehicle 200 notifies the control server 100 of information that the charging service is completed after the charging service is completed, the controller 140 can transmit a command to move to a corresponding light maintenance service point together with location information of the service point which provides a light maintenance service to the vehicle 200. If the vehicle 200 notifies the control server 100 of the fact that the light maintenance service is completed after the light maintenance service is completed, the controller 140 can transmit a command to move to a corresponding light maintenance service point together with location information of the service point which provides a car washing service to the vehicle 200. In some implementations, the controller 140 can transmit a corresponding fact to the user terminal 400, whenever each service is completed, thus notifying the user of a service progress situation.

In S311, the vehicle 200 can determine whether all the scheduled services are completed.

If all the scheduled services are completed, in S312, the vehicle 200 can transmit a service completion notification to the control server 100.

If the service completion notification is received from the vehicle 200, in S313, the controller 140 of the control server 100 can transmit a command to return to a smart base parking lot to the vehicle 200. In some implementations, if approaching the smart base parking lot when returning to the smart base parking lot, the vehicle 200 can request and receive information about an available parking spot from the control server 100. For example, if the request for the information about the parking spot is received from the vehicle 200, the controller 140 can communicate with a server 600 of the smart base parking lot and can check available parking spots, to thereby provide the vehicle 200 with corresponding information.

In S314, the vehicle 200 can return to the smart base parking lot and can determine whether parking is completed.

After returning to the smart base parking lot and completing the parking, in S315, the vehicle 200 can transmit a parking completion notification to the control server 100.

If the parking completion notification is received from the vehicle 200, in S316, the control server 100 can transmit a service completion notification and a parking completion notification to the user terminal 400.

The user terminal 400 can display the service completion notification, the parking completion notification, and benefit information obtained while the user uses the vehicle management service on its screen. For example, the benefit information can include information for comparing total cost if simply parking in a parking lot with total cost if using the vehicle management service.

If the exit is entered in the user terminal 400 from the user, in S317, the user terminal 400 can transmit an exit command to the vehicle 200.

If the exit command is received from the user terminal 400, in S318, the vehicle 200 can move to a predetermined pickup place.

Figure 4:
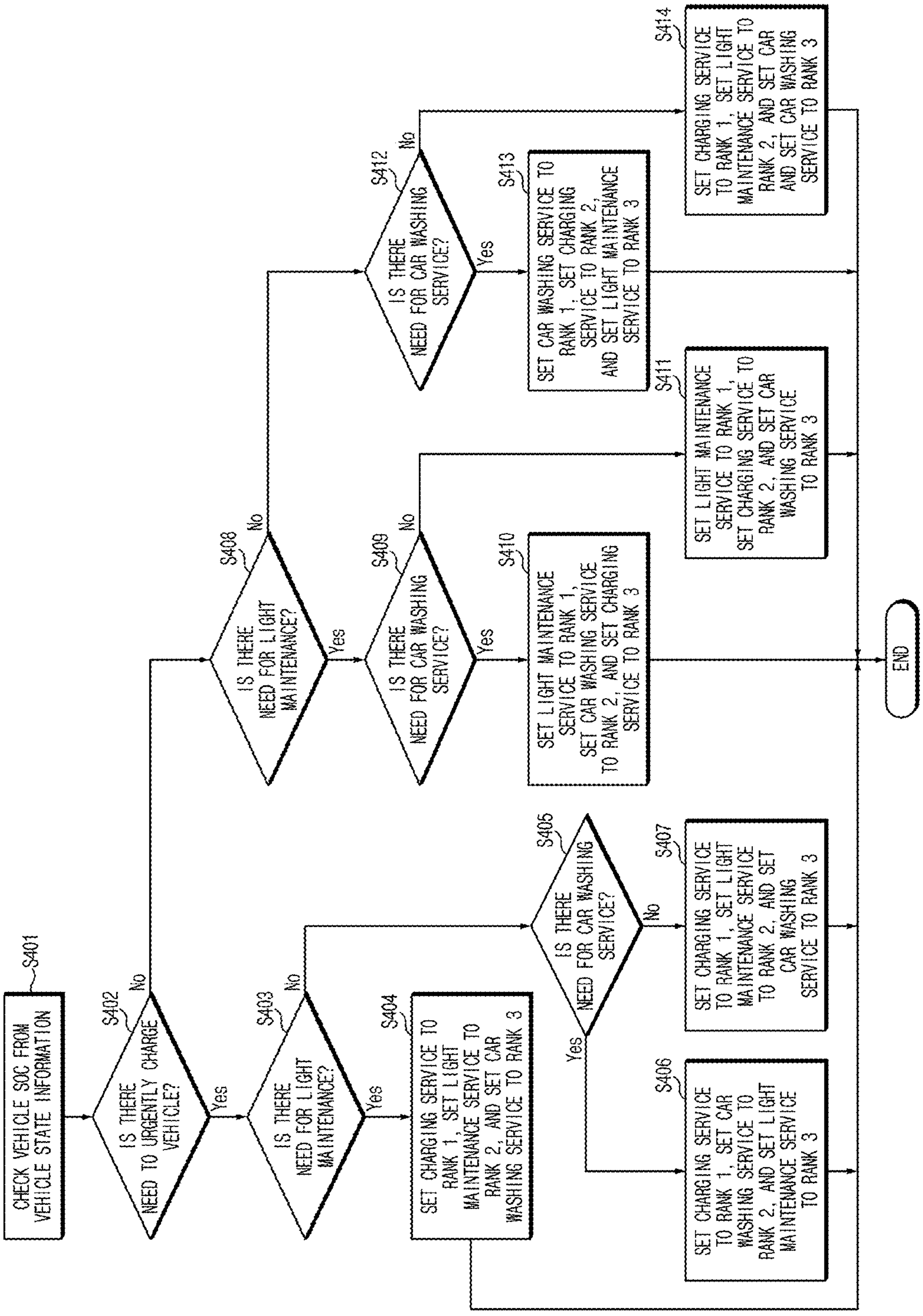
FIG. 4 is a flowchart for describing an example of a method for generating a service combination using a priority algorithm.

FIG. 4 is a flowchart for describing a method for generating a service combination using a priority algorithm.

Referring to FIG. 4, in S401, a scheduler 130 can check a vehicle state of charge (SoC) from vehicle state information.

In S402, the scheduler 130 can determine whether there is a need to urgently charge a vehicle 200 based on the vehicle SoC. For example, the scheduler 130 can set a charging service to rank 1 if the vehicle SoC is less than 25%, can set the charging service to rank 2 if the vehicle SoC is greater than or equal to 25% and is less than or equal to 50%, and can set the charging service to rank 3 if the vehicle SoC is greater than 50% and is less than or equal to 75%. In some implementations, if a time to use a vehicle management service is sufficient even if the vehicle SoC is greater than 75%, the scheduler 130 may set the charging service to rank 1.

If determining that there is the need to urgently charge the vehicle 200, in S403, the scheduler 130 can determine whether there is a need for light maintenance based on a diagnostic trouble code in the vehicle state information, information detected by a sensor of the vehicle 200, and maintenance service payment details of an in-car payment service. For example, the scheduler 130 can set a light maintenance service to rank 1 if the diagnostic trouble code is A, can set the light maintenance service to rank 2 if the diagnostic trouble code is B, and can set the light maintenance service to rank 3 if the diagnostic trouble code is C.

Furthermore, the scheduler 130 can set the light maintenance service to rank 1 if there is a need for immediate action to the extent that there is a problem with driving based on the determined result and may set the light maintenance service to rank 2 if there is no problem with driving, but if problems may occur in the vehicle 200 when light maintenance is not performed.

If determining that there is the need to urgently charge the vehicle 200 and that there is the need for the light maintenance, in S404, the scheduler 130 can set the charging service to rank 1, can set the light maintenance service to rank 2, and can set the car washing service to rank 3 to set a service combination. For example, if there is a need for both of charging and light maintenance, the scheduler 130 can prioritize the charging over the light maintenance. Furthermore, if there is a need for all of charging, light maintenance, and car washing, the scheduler 130 can prioritize the charging and the light maintenance over the car washing.

In some implementations, if there is the need for both the charging and the light maintenance in S404, the scheduler 130 can determine the car washing as rank 3 regardless of whether there is a need for the car washing.

If determining that there is the need to urgently charge the vehicle 200 and that there is no need for the light maintenance, in S405, the scheduler 130 can determine whether there is a need for a car washing service based on image analysis data using a camera sensor, car washing service payment details of the in-car payment service, car wash location information using a global positioning system (GPS), rain sensor operation data information, and weather information. For example, if checking that there is dirt on the surface of the vehicle 200 as a result of the image analysis using the camera sensor, the scheduler 130 can determine that there is a need for a car washing service.

If payment details of the car washing service among payment details of the in-car payment service is checked or if the rain sensor of the vehicle 200 operates at a car wash location in clear weather using GPS information and weather information, the scheduler 130 can determine that the car washing service is performed.

If checking the day when the fine dust index is in a dangerous level after two weeks elapse from the time point when it is determined that the car washing service is performed, the scheduler 130 can determine that there is the need for the car washing service.

If determining that there is the need to urgently charge the vehicle 200 and that there is no need for the light maintenance, and that there is the need for the car washing, in S406, the scheduler 130 can set the charging service to rank 1, can set the car washing service to rank 2, and can set the light maintenance service to rank 3 to set a service combination.

If determining that there is the need to urgently charge the vehicle 200 and that there is no need for the light maintenance, and that there is no need for the car washing, in S407, the scheduler 130 may set the charging service to rank 1, may set the light maintenance service to rank 2, and may set the car washing service to rank 3 to set a service combination.

If determining that there is no need to urgently charge the vehicle 200 in S402, in S408, the scheduler 130 may determine whether there is a need for light maintenance. At this time, the scheduler 130 may determine whether there is the need for the light maintenance service by means of the same method as that in S403.

If determining that there is no need to urgently charge the vehicle 200 and that there is the need for the light maintenance, in S409, the scheduler 130 may determine whether there is a need for a car washing service. At this time, the scheduler 130 may determine whether there is the need for the car washing service by means of the same method as that in S405.

If determining that there is no need to urgently charge the vehicle 200, that there is the need for the light maintenance, and that there is the need for the car washing, in S410, the scheduler 130 may set the light maintenance service to rank 1, may set the car washing service to rank 2, and may set the charging service to rank 3 to set a service combination.

If determining that there is no need to urgently charge the vehicle 200, that there is the need for the light maintenance, and that there is no need for the car washing in S409, in S411, the scheduler 130 may set the light maintenance service to rank 1, may set the charging service to rank 2, and may set the car washing service to rank 3 to set a service combination.

If determining that there is no need to urgently charge the vehicle 200 and that there is no need for the light maintenance in S408, in S412, the scheduler 130 may determine whether there is a need for the car washing service. At this time, the scheduler 130 may determine whether there is the need for the car washing service by means of the same method as that in S405.

If determining that there is no need to urgently charge the vehicle 200, that there is no need for the light maintenance, and that there is the need for the car washing, in S413, the scheduler 130 may set the car washing service to rank 1, may set the charging service to rank 2, and may set the light maintenance service to rank 3 to set a service combination.

If determining that there is no need to urgently charge the vehicle 200, that there is no need for the light maintenance, and that there is no need for the car washing in S412, in S414, the scheduler 130 may set the charging service to rank 1, may set the light maintenance service to rank 2, and may set the car washing service to rank 3 to set a service combination. Alternatively, the scheduler 130 may transmit a message that an SoC, a light maintenance state, and a car washing state are good to the vehicle 200.

Figure 5:
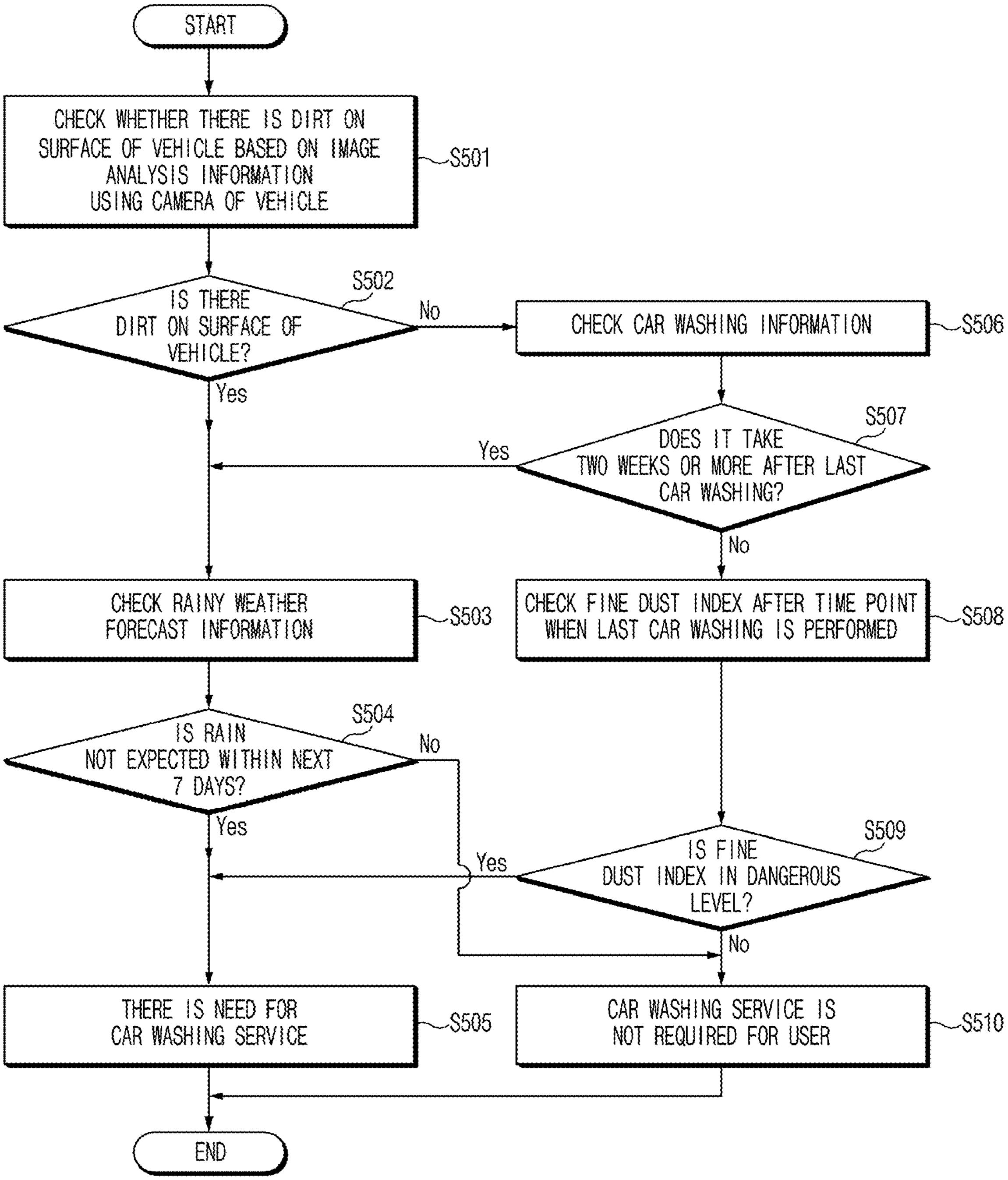
FIG. 5 is a flowchart for describing an example of a method for checking whether there is a need for a car washing service in FIG. 4.

FIG. 5 is a flowchart for describing in detail a method for checking whether there is a need for a car wash service in FIG. 4.

Referring to FIG. 5, in S501, a scheduler 130 may check whether there is dirt on the surface of a vehicle 200 based on image analysis information using a camera of the vehicle 200.

If the dirt is checked on the vehicle 200 in S502, in S503, the scheduler 130 may receive weather information based on a network and may check rainy weather forecast information.

In S504, the scheduler 130 may determine whether rain is expected within the next 7 days based on the rainy weather forecast information.

If the dirt is checked on the vehicle 200 and the rain is not expected within the next 7 days, in S505, the scheduler 130 may determine that there is a need for a car washing service. When the rain is expected within the next 7 days, in S510, the scheduler 130 may determine that there is no need for the car washing service.

If there is no dirt on the vehicle 200 based on the image analysis information using the camera of the vehicle 200 in S502, in S506, the scheduler 130 may check car washing information of the vehicle 200. At this time, the scheduler 130 may check information about car wash payment details paid with an in-car payment service, weather information, car wash location information using a GPS, and whether a rain sensor operates and may check whether car washing proceeds, if there are car washing service payment details or the rain sensor operates at a car wash in clear weather.

In S507, the scheduler 130 may determine whether it takes two weeks or more after the last car washing based on the car washing information.

If it is determined that it takes the two weeks or more after the last car washing, the scheduler 130 may proceed with S502.

When it does not take the two weeks or more after the last car washing, in S508, the scheduler 130 may check a fine dust index after a time point when the last car washing is performed by means of the weather information collected based on the network.

In S509, the scheduler 130 may check whether there is a day when the fine dust index is in a dangerous level after the time point when the last car washing is performed.

If the day when the fine dust index is in the dangerous level after the time point when the last car washing is performed is checked, the scheduler 130 may determine that a car washing service is required for a user. If the day when the fine dust index is in the dangerous level after the time point when the last car washing is performed is not checked, in S510, the scheduler 130 may determine that the car washing service is not required for the user.

A computing system associated with the vehicle management system may include at least one processor, a memory, a user interface input device, a user interface output device, storage, and a network interface, which are connected with each other via a bus.

The processor may be a central processing unit or a semiconductor device that processes instructions stored in the memory and/or the storage. The memory and the storage may include various types of volatile or non-volatile storage media. For example, the memory may include a read only memory (ROM) and a random access memory (RAM).

Accordingly, the operations of the method or algorithm described in connection with the implementations disclosed in the specification may be directly implemented with a hardware module, a software module, or a combination of the hardware module and the software module, which is executed by the processor. The software module may reside on a storage medium (that is, the memory and/or the storage) such as a RAM, a flash memory, a ROM, an EPROM, an EEPROM, a register, a hard disc, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

In some implementations, a vehicle parking in a main base parking lot with a vehicle management service can provide the user with a vehicle service previously registered by the user without taking a separate time during a vehicle parking time.

The effects of the present disclosure are not limited to the above-described effects and other effects which are not described herein will become apparent to those skilled in the art from the following description.

What is claimed is:

1. A vehicle management system for a smart base parking lot, the vehicle management system comprising:
- a vehicle configured to perform autonomous driving and remote communication;
- one or more service point servers configured to manage operating information of one or more service points located within a predetermined distance from one or more smart base parking lots; and
- a control server configured to:
  - determine whether a destination provided from the vehicle is the smart base parking lot,
  - in response to the destination being the smart base parking lot, transmit a combination of one or more vehicle management services available at one or more service points to the vehicle, and
  - control autonomous driving of the vehicle based on the one or more vehicle management services,
- wherein the combination of the one or more vehicle management services is generated based on (i) information regarding service points received from each of the one or more service point servers corresponding to the destination and (ii) state information regarding the vehicle.

2. The vehicle management system of claim 1,
- wherein the control server is configured to:
- combine the one or more vehicle management services available based on a predetermined vehicle management service recommendation scheme for reducing processing time; and
- present the combined vehicle management service to a user.

3. The vehicle management system of claim 2, wherein the control server is configured to:
- generate priorities of a charging service, a light maintenance service, and a car washing service of the vehicle based on the state information of the vehicle; and
- present a vehicle management service to the user based on the generated priorities.

4. The vehicle management system of claim 3, wherein the control server is configured to:
- generate the priority of the charging service of the vehicle based on a state of charge (SoC) of the vehicle; and
- present, to the user, the charging service of the vehicle based on the generated priority of the charging service.

5. The vehicle management system of claim 3, wherein the control server is configured to:
- generate the priority of the light maintenance service of the vehicle based on a diagnostic trouble code of the vehicle; and
- present, to the user, the light maintenance service of the vehicle based on the generated priority of the light maintenance service.

6. The vehicle management system of claim 3, wherein the control server is configured to:
- analyze an image for the vehicle, the image being received using a camera sensor of the vehicle; and
- generate the priority of the car washing service based on the analyzed image.

7. The vehicle management system of claim 3, wherein the control server is configured to:
- determine, based on (i) payment details of the car washing service among payment details of an in-car payment service being checked or (ii) a rain sensor of the vehicle being operated in a place where a car wash is located in clear weather according on global positioning system (GPS) information and weather information, that the car washing service has been performed.

8. The vehicle management system of claim 7, wherein the control server is configured to:
- determine, based on a predetermined time being elapsed from a day when the car washing service is performed, a need for the car washing service.

9. A control server of a vehicle management system, the control server comprising:
- a database configured to store information regarding one or more smart base parking lots and information for each service point related to one or more service points corresponding to the one or more smart base parking lots;

a scheduler configured to, based on a scheduling command being received, generate a combination of vehicle management services based on a destination and vehicle state information provided from a vehicle, service operation information regarding one or more available service points corresponding to the destination, and the information for each service point related to the one or more available service points, the information being stored in the database; and a controller configured to:

determine whether the destination is the smart base parking lot, in response to the destination being determined as the smart base parking lot, request and receive the service operation information from the one or more available service points, and transmit the scheduling command to the scheduler.

10. The control server of claim 9, wherein the scheduler is configured to:

determine an available time slot for each available service point corresponding to the destination; and generate the combination of vehicle management services that reduces overall time required and that utilizes available services.

11. The control server of claim 9, wherein the scheduler is configured to:

generate the combination of vehicle management services for first recommending vehicle management services preferred for each user based on accumulated vehicle management service selection information of a user.

12. The control server of claim 9, wherein the scheduler is configured to:

apply predetermined priorities to the vehicle management services to generate the service combination.

13. The control server of claim 9, wherein the controller is configured to:

based on the destination being the smart base parking lot, request the service operation information from one or more servers of service points in the smart base parking lot or one or more service points within a predetermined distance from the smart base parking lot.

14. The control server of claim 9, wherein the controller is configured to:

control the vehicle to perform autonomous driving to move to the one or more available service points based on the combination of vehicle management services.

15. The control server of claim 9, wherein the controller is configured to:

transmit, to a user terminal, an indicator informing that each vehicle management service included in the combination of vehicle management services is completed, based on each vehicle management service included in the combination of vehicle management services being completed.

16. The control server of claim 9, wherein the controller is configured to:

based on the vehicle management services included in the combination of vehicle management service being completed, control the vehicle to perform autonomous driving to return to the smart base parking lot.

17. The control server of claim 9, wherein the controller is configured to:

based on the vehicle moving to return to the smart base parking lot, communicate with a parking lot server to receive information regarding an available parking spot; and control the vehicle to autonomously park in the parking spot.

18. A vehicle management method for a smart base parking lot, the vehicle management method comprising:

determining, based on a destination being received from a vehicle, whether the destination is a smart base parking lot;

receiving, in response to the destination being determined as the smart base parking lot, service operation information from one or more available service points corresponding to the destination; and generating a combination of vehicle management services based on the destination and vehicle state information provided from the vehicle, the service operation information, and information for each service point related to the one or more available service points, the information being stored in a database.

19. The vehicle management method of claim 18, wherein receiving the service operation information includes:

requesting the service operation information from (i) one or more servers of the one or more service points in the smart base parking lot or (ii) one or more service points within a predetermined distance from the smart base parking lot.

20. The vehicle management method of claim 18, wherein generating the combination of vehicle management services includes:

determining an available time for each service point corresponding to the smart base parking lot; and generating the combination of vehicle management services with reduced processing time and utilizing available services.

* * * * *